United States Patent [19]

Ross

[11] 4,169,991

[45] Oct. 2, 1979

[54] VARIABLE PRINT SPEED CONTROL

[75] Inventor: Charles O. Ross, Endicott, N.Y.

[73] Assignee: International Business Machines Corporation, Armonk, N.Y.

[21] Appl. No.: 820,482

[22] Filed: Jul. 29, 1977

Related U.S. Application Data

[63] Continuation of Ser. No. 606,255, Aug. 20, 1975.

[51] Int. Cl.² .............................................. G05B 11/28
[52] U.S. Cl. .................................... 318/599; 318/603; 400/320; 400/322
[58] Field of Search ............... 318/600, 601, 603, 599, 318/341, 561; 400/320, 322

[56] References Cited

U.S. PATENT DOCUMENTS

| | | | |
|---|---|---|---|
| 2,867,724 | 1/1959 | Olson | 318/603 |
| 3,496,547 | 2/1970 | Gorrill et al. | 340/172.5 |
| 3,761,880 | 9/1973 | Kritz et al. | 340/172.5 |
| 3,950,682 | 4/1976 | Dohanich et al. | 318/341 |
| 3,950,685 | 4/1976 | Kramer | 318/603 |
| 3,986,091 | 10/1976 | Quiogue et al. | 318/603 |
| 3,990,559 | 11/1976 | Martin et al. | 364/900 |

*Primary Examiner*—Gene Z. Rubinson
*Assistant Examiner*—Eugene S. Indyk
*Attorney, Agent, or Firm*—K. P. Johnson

[57] ABSTRACT

The carrier for the print head of a printer which is to be used at different operating speeds as a display printer, as a read-only printer, or as a keyboard display printer with asynchronous character rates over a wide range, is operated by a servo motor under the control of a digital/analog converter which continually sums the outputs of an up/down counter which is incremented by incoming data and decremented by the output of a shift register advanced by the incoming data.

13 Claims, 7 Drawing Figures

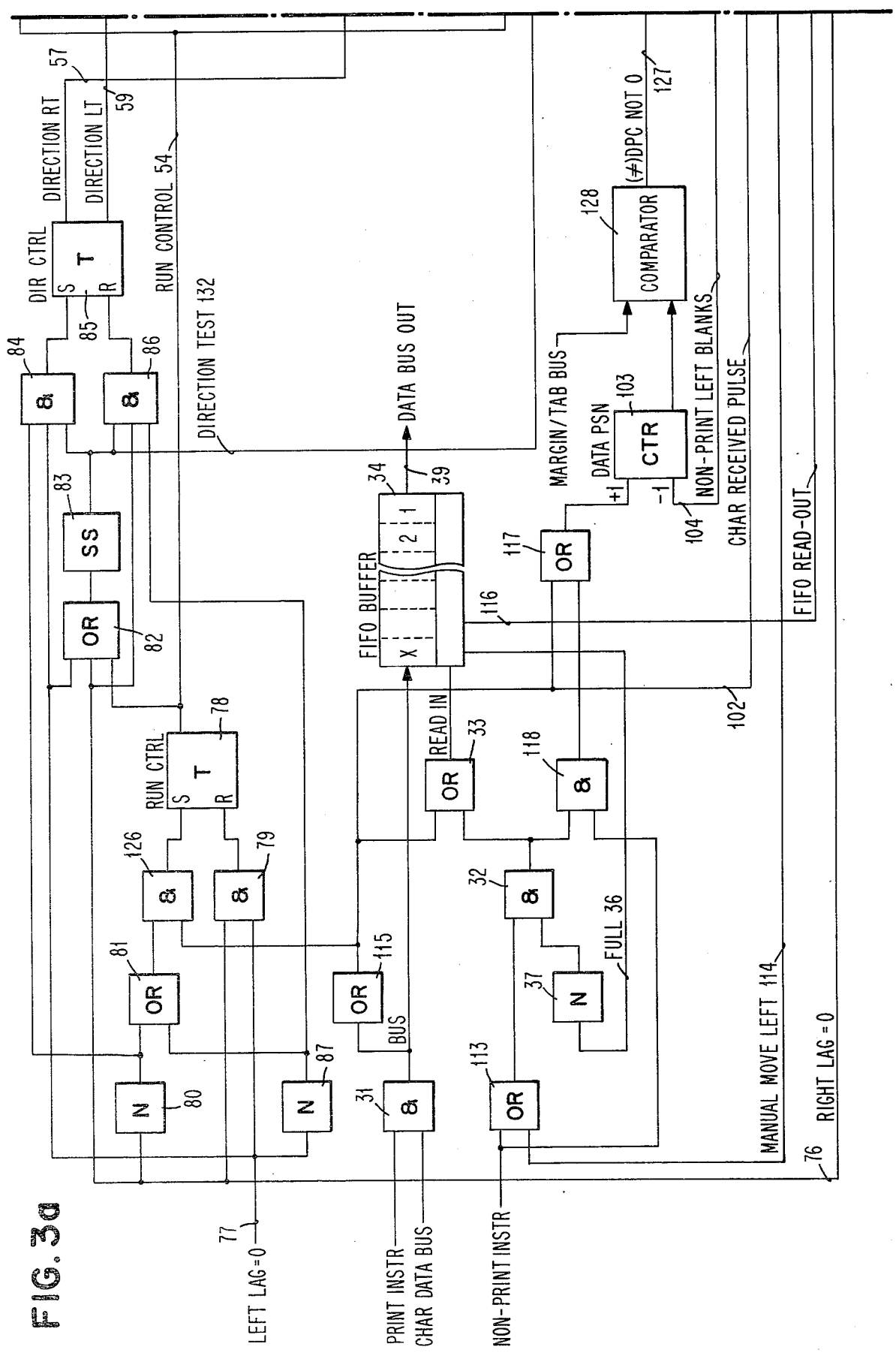

VARIABLE PRINT SPEED CONTROL

This is a continuation of application Ser. No. 606,255 filed Aug. 20, 1975.

BACKGROUND OF THE INVENTION

1. Field of the Invention

The invention relates generally to print head carrier drives for variable speed serial printers.

2. Description of the Prior Art

U.S. Pat. No. 3,766,459 which issued on Oct. 16, 1973 to Michael D. McIntosh, et al shows the use of an up/down counter controlling a machine tool motor through a digital/analog converter.

U.S. Pat. No. 3,793,511 which issued on Feb. 19, 1974 to John L. Bala, et al discloses the use of an input buffer with an up/down counter continuously compared with a count proportional to a desired motor velocity to regulate the velocity of a motor in a machine tool system.

U.S. Pat. No. 3,798,524 which issued on Mar. 19, 1974 to Kiyokazu Okamoto discloses the use of a reversible counter and a digital/analog converter for controlling a machine tool motor in accordance with input signals and a direction command.

SUMMARY OF THE INVENTION

Generally stated it is an object of the invention to provide an improved type head carrier drive for a printer.

More specifically it is an object of the invention to provide for operating the print head carrier of a printer at various rates in accordance with the rate of input data to be printed.

Another object of the invention is to provide for moving the print head carrier in a printer at a rate which is proportional to how far the printer is behind the incoming data.

Yet another object of the invention is to provide for measuring how far a serial printer is behind the incoming data to be printed and using analog means to control the print head carrier drive accordingly.

It is also an object of the invention to provide for controlling the print head carrier of a serial printer over a wide range of operating rates in accordance with the lag of the printer behind the incoming data through the utilization of digital control means.

The foregoing and other objects, features and advantages of the invention will be apparent from the following more particular description of preferred embodiments of the invention as illustrated in the accompanying drawing.

DESCRIPTION OF THE DRAWING

In the drawing;

FIGS. 3a, 3b and 3c taken together are a schematic circuit diagram of a print head carrier control system embodying the invention in an alternate form.

DESCRIPTION OF A PREFERRED EMBODIMENT

Figure 1:
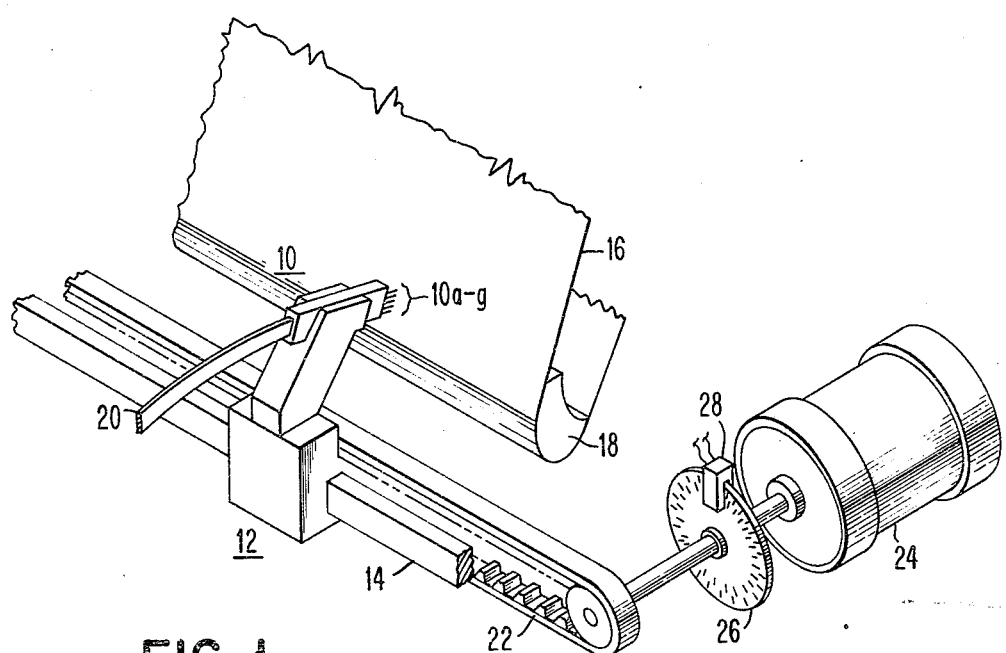
FIG. 1 is a schematic isometric view in part of a printer mechanism with which the invention may be used.

As shown in FIG. 1 a print head 10 comprising a plurality of spaced apart and electrically insulated electrodes 10a–g are mounted on a carrier 12 for movement along a guide support 14 for printing on a document 16 which is backed up by a conductive platen 18. The electrodes 10a–g are connected by a flexible cable 20 to a source of electrical pulses which selectively energize the electrodes 10a–g to form a matrix pattern characters on the document which may be of the metalized foil type.

The carrier 12 is moved along the guide 14 by means of a toothed belt 22 driven by a servo motor 24 having an emitter disc 26 on the motor shaft provided with a transducer 28 providing pulses to determine the carrier position along the print line of the document 16.

The particular control implementation for the motor 24 herein assumes total insensitivity to velocity so that displacements before and after printing are only necessary to assure adequate printing displacement, and further that printing is done in one direction with carrier return at any desired velocity within the system capability.

Basic printing rates that may be desired are: (1) as a display printer with the rate as fast as the printer is capable, (2) as a read-only printer with the rate slaved to the incoming data rate, provided it is no greater than printer capability, (3) as a keyboard display printer where the data is highly asynchronous from one character at a time to 15 or 20 characters/sec., short bursts with an average of less than 5 characters/sec. and (4) as a combined form of (2) and (3) as a terminal printer such that any terminal replies would be printed at the line receive rate, as limited by printer maximum capability.

This design incorporates a scheme for automatically forcing the maximum "TAB/carrier return" velocities of which the drive system is capable by utilizing "blank" characters which force the desired velocity profiles but do not cause a printed output.

Figure 2:
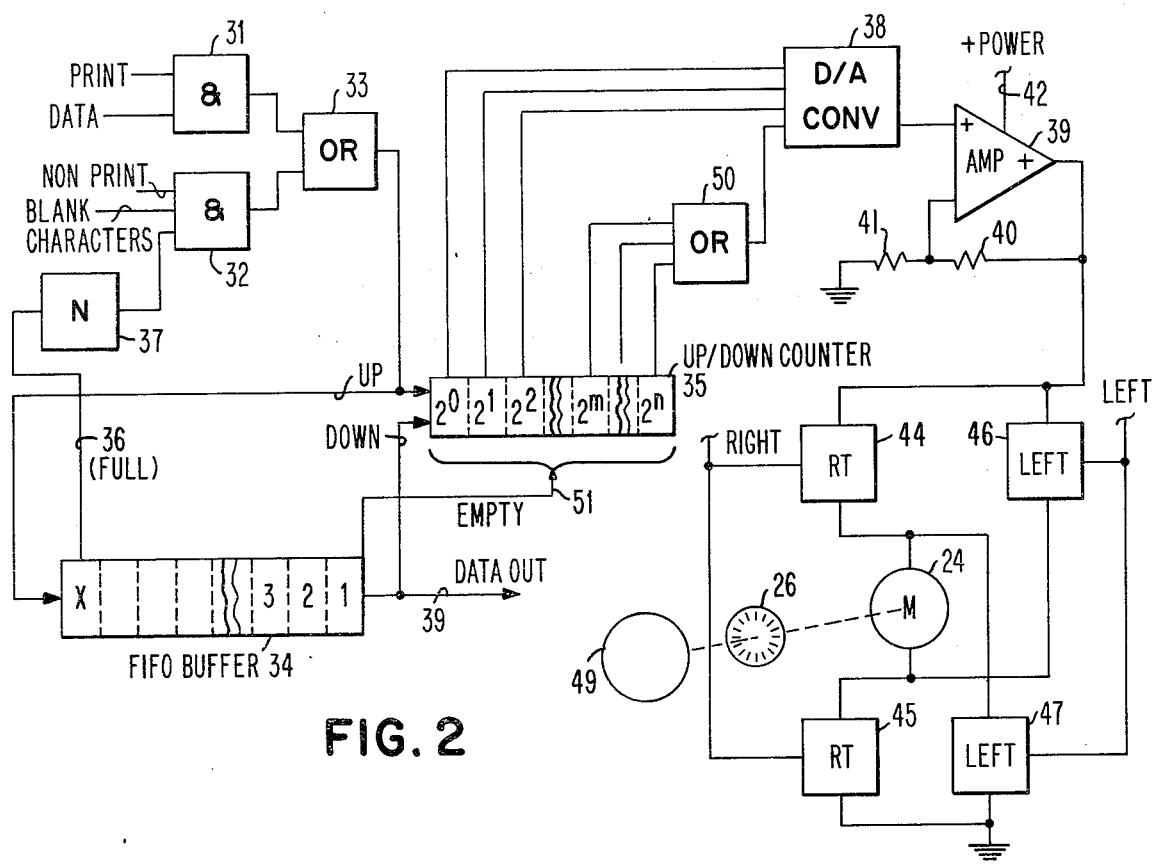
FIG. 2 is a schematic circuit diagram of a print head carrier control embodying the invention in a preferred form.

FIG. 2 is a schematic circuit diagram of the pertinent portions of the system in which AND 31 has input controls which (a) determine that the incoming data is to be printed and (b) condition the data as to source (keyboard, line, display, etc.). It is assumed that the size of the buffer 34 and the print rates are such that the buffer 34 will not overflow so that no data is lost.

AND 32 has input controls (a) that determine the incoming data is not to be printed but rather a predetermined number of print positions are to be skipped as quickly as possible (b) that provide a source of "blank" characters at a rate far exceeding print rate capability and (c) that reduce the receipt of these high-rate "blanks" if the buffer should become full. OR 33 combines these exclusive data sources and presents this data to the FIFO 34 (a FIRST IN/FIRST OUT data buffer) and increments the up/down counter 35 once for each input character. The FIFO 34 has an output FULL 36 which thru inverter 37 prevents receipt of more blanks than it can handle, an output EMPTY 51 which assures that the up/down counter 35 maintains long term synchronism with the correct data depth count in the FIFO 34 and the actual DATA OUT 39 that is to be printed. FIFO 34 input data rates are controlled by ANDS 31 and 32 while DATA OUT 39 is withdrawn at the particular rate the printer happens to be running at any given time. The DATA OUT 39 may be fed to suitable decode means not shown which provide for selective energization of the electrodes 10a through 10g for forming characters as the print head 10 moves along the print line. Each time a character is extracted from FIFO 34, it decrements the up/down counter 35 so that the counter 35 is a measure of the depth (number of characters) of data in the FIFO 34. This amounts to a determination of how far the printer is behind the incoming data. The maximum binary sum of the up/down counter 35 positions must equal or exceed (x) where (x) is the length of FIFO 34 or a very high data rate would cause loss of print velocity control.

Outputs from the up/down counter 35 are continually summed by a D/A (digital-analog) converter 38 except that, as required by the design, counter values in excess of a particular value cause no further increase in the analog output of the converter 38 but rather keep it at the maximum intended value via OR 50. Amplifier 39 operationally follows the converter 38 output at a gain determined by the resistors 40 and 41. Amplifier 39 draws power from the (+) power supply 42 and delivers it to the servo motor 24 through current switches 44 and 45 if the carrier is to run to the right or through current switches 46 and 47 if the carrier is to return to the left. Emitter 26 and transducer 28 are utilized to sense printing position and determine printing synchronism within a position for sense velocity. The circle 49 represents the load of the carrier 12 through the drive system.

This print velocity control prints behind the reception of data by a number of characters that is proportional to the data rate up to the maximum print capability without additional control complexity.

The permissible output levels from the converter 38 are such that one character in the buffer 34 will apply a small voltage to the servo motor 24 and that character will print very slowly. This would be typical of keyboard input data printing. Since the buffer is nearly empty, there is no need to hurry the printing process which would only cause additional (a) power dissipation in the system, (b) strain and wear on the mechanical drive system, (c) audible noise and (d) reduction of motor brush life due to higher currents.

Another preferred embodiment of the variable print speed control system utilizes digital pulse width control of the servo motor 24. The frequency of drive pulses is fixed at a rate much higher than the inverse of the system mechanical time constant so that the velocity does not change appreciably during each pulse time. Velocity is checked once each pulse interval and the following motor drive pulse width is incrementally changed to keep the velocity at approximately the desired value.

The circuitry of FIG. 3a extracts from FIG. 2 (the analog control) the digital controls and adds detail to show data control for manually caused, as well as powered, motion of the print carrier 12. AND 31 gates character bus data to the FIFO buffer 34 as before, while OR 115 creates a character received pulse 102 from the FIFO input bus and, through OR 33 a FIFO read-in cycle is taken so the character is stored in sequence in the asynchronous buffer. A non-print instruction (space or tab right) or a manual move left 114 through OR 113 and AND 32 and OR 33 will cause a blank character to read-in the buffer 34 provided full signal 36 is not active so that the inverter 37 is OFF. If a non-print instruction places a blank character in the buffer 34, it will, through AND 118 and OR 117, increment the data position counter 103. Likewise a character received pulse 102 will increment the counter through OR 117. The counter is decremented by nonprint left blanks 104 which occur once each column on carrier return or backspace operations. FIFO read-out 116 occurs once for each column move to the right and it causes the buffer 34 to gate out the next character to be printed 39.

Figure 3B:
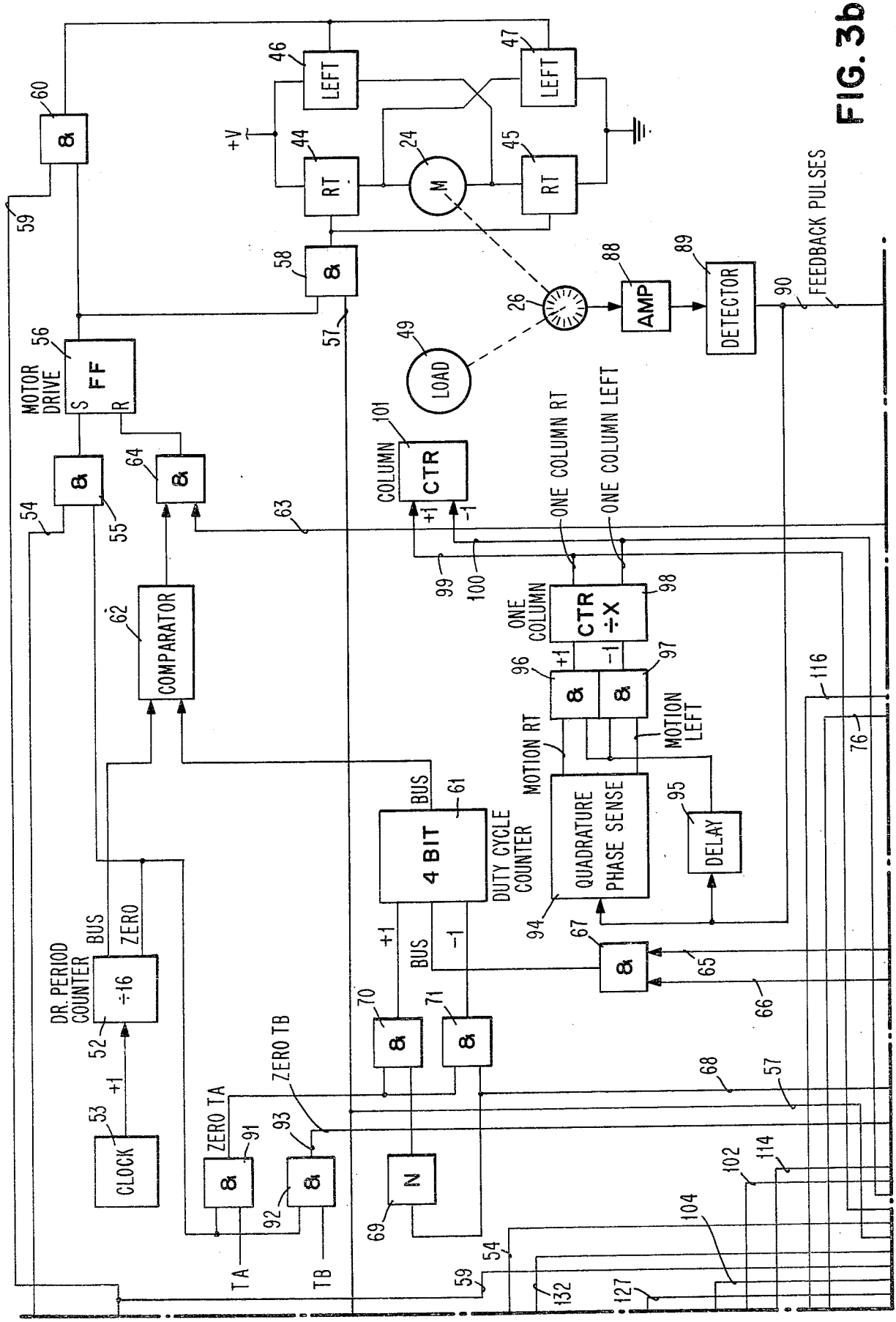

In FIG. 3b, the servo motor 24 rotates the two-track quadrature optical transducer 26 and the load 49. Transducer 26 signals are amplified at 88 and detected at 89 where they become quadrature related feedback pulses 90.

In FIG. 3b the quadrature phase sense 94 uses the quadrature feedback pulses 90 to determine the actual direction of carrier motion right or left. The pulses 90 are delayed by delay 95 and gated through AND 96 or AND 97 to cause the one column counter 98 to increment if right motion or decrement if left motion. The counter 98 modulus equals the number of quadrature pulses 90 per print column. When the counter 98 overflows, a one-column right signal 99 is generated and a column counter 101 incremented; when the counter 98 underflows, a one column left signal 100 is generated and counter 101 is decremented. The column counter 101 is used in conjunction with the data position counter 103 in FIG. 3a and both are shown only to indicate uses of the signals used in the velocity control logic.

Figure 3C:
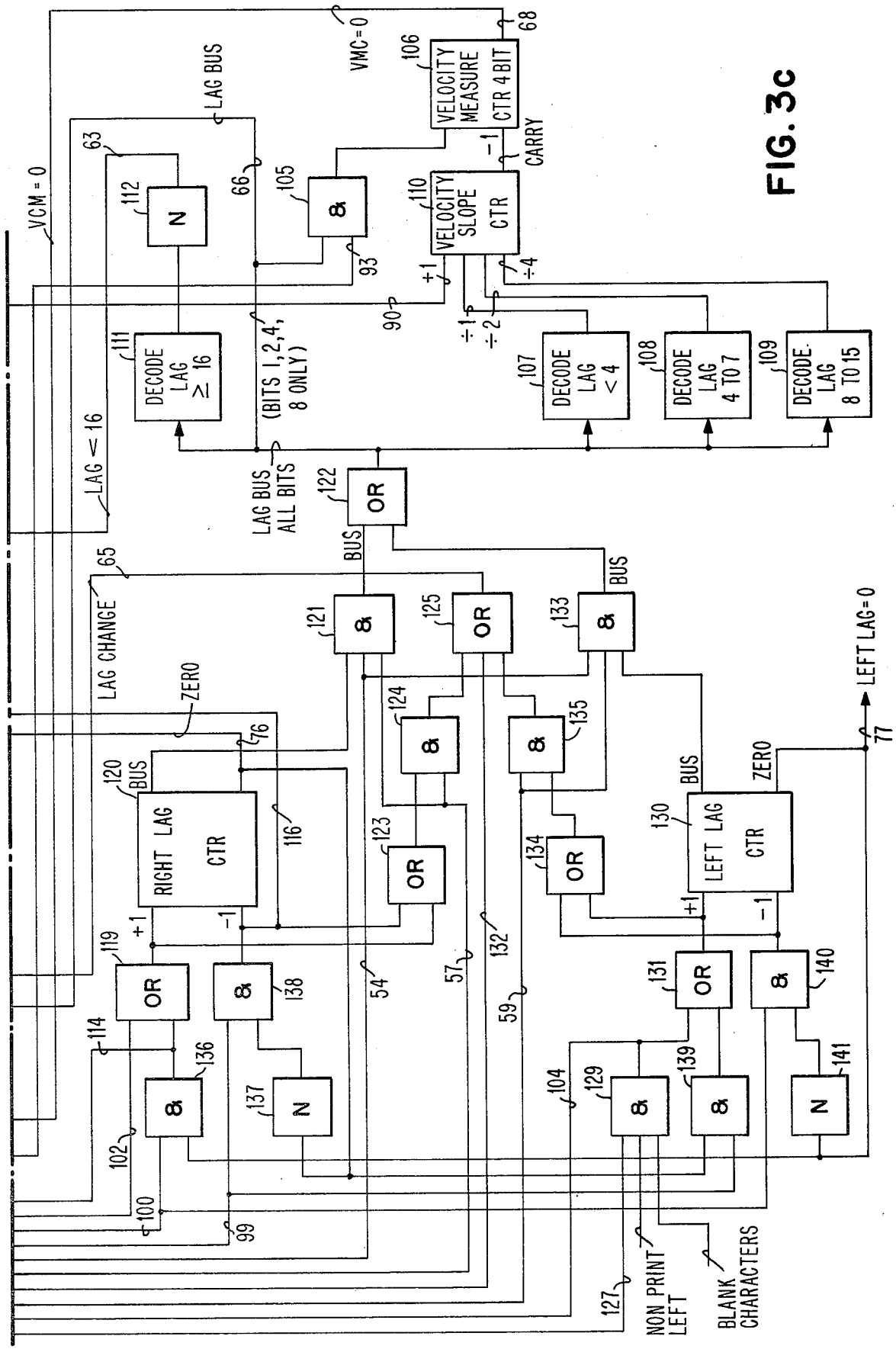

The logic in FIG. 3c keeps track of how far the printer motion is behind incoming information for each direction and performs the velocity measurement function. When a character received pulse 102 increments right lag counter 120 through OR 119, the right lag= 0 signal 76 goes OFF and in FIG. 3a inverter 80 is turned OFF so that the run control trigger 78 will be set through OR 81 and AND 126. Single-shot 83 is set through OR 82. Left lag= 0, 77 is ON so direction control trigger 85 is set through AND 84 and direction right signal 57 is provided. In FIG. 3b clock 53 is continuously incrementing drive period counter 52 so that the next time counter 52 goes to zero, motor drive trigger 56 will be set through AND 55 with run control 54 ON. Motor drivers 44 and 45 will turn ON immediately through AND 58 the motor 24 will turn ON and move the printer carrier 12 to the right. In FIG. 3c when right lag counter 120 was incremented to one its bus output will pass through bus AND 121 as soon as run control 54 and direction right 57 are active and that bus signal will appear on the common lag bus through bus OR 122. The counter 120 increment signal through OR 123 and the direction right signal pass through AND 124 and OR 125 to provide a lag change signal 65. The common lag bus low-order bits 1 through 4 become lag bus 66 so that when counter 52 next goes to zero, they will be gated through bus AND 105 at zero TB time 93 from AND 92 and pre-set velocity measure counter 106 to the value of lag bus 66 which is in this case a one from the right lag counter 120.

In FIG. 3b when lag change 65 and lag bus 66 are on, duty cycle counter 61 will preset to the lag bus value (a one in this case) through bus AND 67. The first time counter 52 goes to zero it not only sets trigger 56 but at time TA through AND 91 it will test the VMC=0 (68) line to see if the measured velocity is higher or lower than it should be. Initially VMC= 0 (68) is OFF at this time because counter 106 was just preset to one so inverter 69 is OFF and counter 61 will be incremented by 1 through AND 70; counter 61 now is at two and counter 52 is at zero.

The development of signals clock 53, TA and TB in FIG. 3b is not shown because it would be evident to those skilled in the art. Typical values and conditions for those signals would be as follows: a 2 mhz oscillator would drive an 8-bit binary counter and clock 53 is the last stage of that counter so that drive period counter 52 would advance once each 256 microseconds and have a period of 4.096 milliseconds. Pulses TA and TB would be one microsecond wide with three microseconds between them (TA followed by TB); further, they occur only once each period of counter 52 (when counter 52 has just become zero).

Status at this time is: motor drive trigger 56 is ON and the drive motor 24 is powered to the right. As time progresses, clock 53 advances counter 52 and when its value equals the value in duty cycle counter 61 as detected by comparator 62, the motor drive trigger 56 will be reset through AND 64; since the lag bus value is one, the Lag < 16 line 63 is ON. Motor drivers 44 and 45 will be turned OFF so that the servo motors 24 and the load will coast until the trigger 56 is turned on again the next time counter 52 goes to zero and run control 54 is ON.

When counter 52 and pulse TA switch gate in AND 91 each time, the zero TA pulse tests the VMC=0 line 68. If the line is not zero, the measured average velocity over the last measurement period was slower than desired so, with inverter 69 OFF, coincidence at AND 70 will increment counter 61 and the next drive pulse width to the motor will be longer because the counter 52 must advance to a higher value to match counter 61 before trigger 56 will terminate the motor pulse; the motor 24 will speed up slightly. Conversely, if VMC=0 (68) is ON, the measured average velocity over the last period was faster than desired so that inverter 69 will be ON and block AND 70 so that the zero TA signal will switch with VMC=0 (68) On through AND 71 to decrement counter 61; the motor pulse will be more narrow next time and the motor will slow down slightly. It can be appreciated that it is rather easy to alter this circuit such that a small band of velocities is categorized as neither fast nor slow and the duty cycle counter 61 would not change each zero TA test time; such change would not depart from the claimed velocity control concept.

Figure 5:
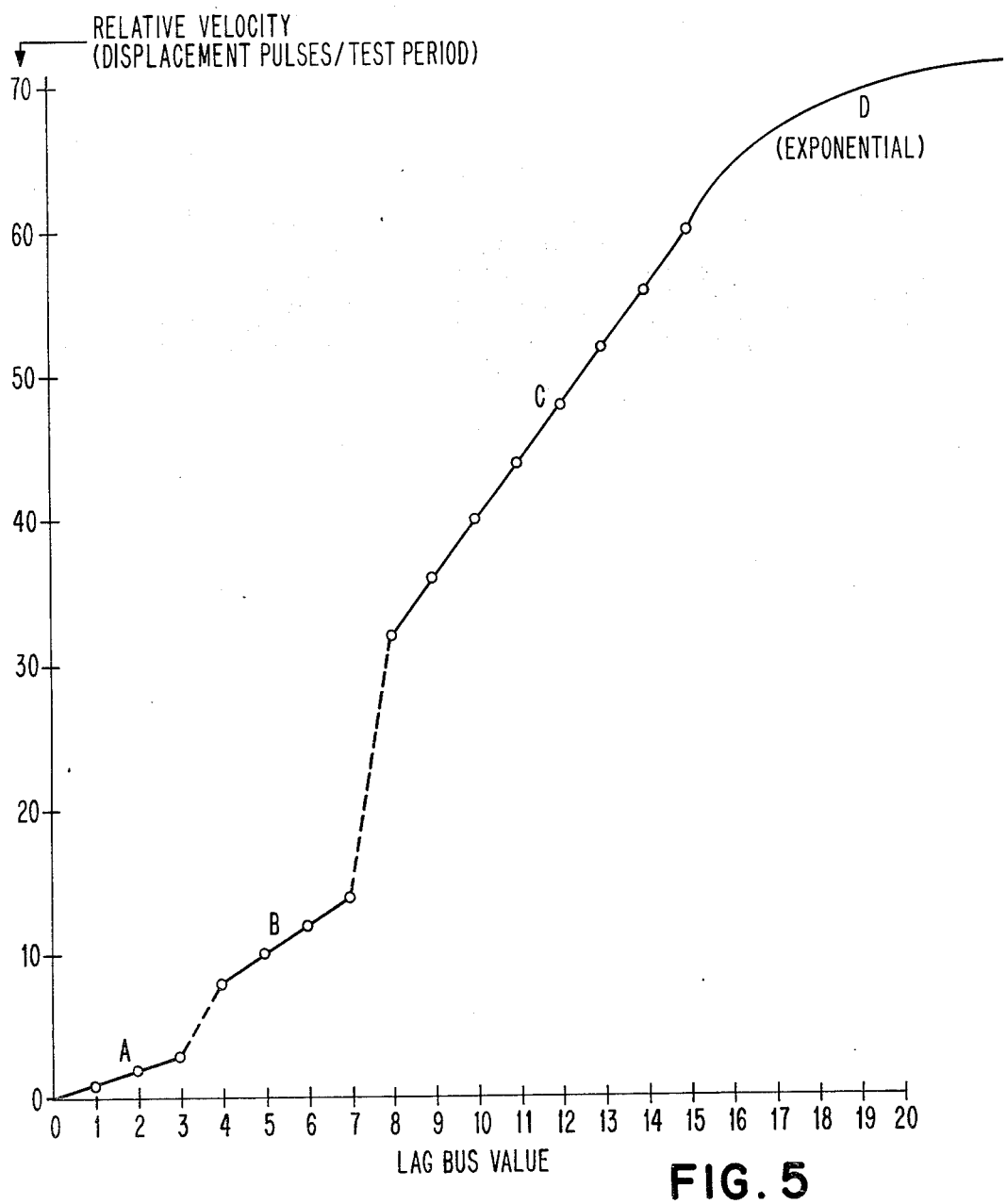
FIG. 5 is a curve showing the relative displacement for different lag bus values.
Figure 4:
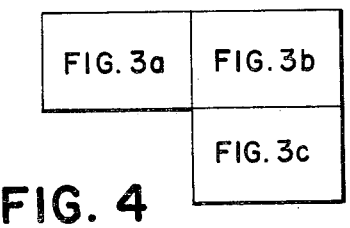
FIG. 4 is a block diagram showing the arrangement of FIGS. 3a, 3b and 3c.

From the relationship of (velocity=displacement÷time), different controlled velocities are obtained by measuring displacement over a constant time interval (the time between trailing and leading edges of pulse zero TA). In FIG. 3c, displacement feedback pulses 90 increment the velocity slope counter 110; each counter carry pulse then decrements velocity measure counter 106. The distance that must be travelled each test period is then given by the displacement per feedback pulse times the number of feedback pulses per test period required to decrement counter 106 to zero; that number is the product of the counter 110 counter divide factor (1, 2 or 4) and the lag bus 66 value at time zero TB 93. FIG. 6 is a graph of the relative displacement, thus velocity for any particular lag bus 66 value. Curve slope A is controlled by decode lag less than 4 (107), slope B is controlled by decode lag 4 through 7 —108, slope C is controlled by decode lag 8 through 15 and curve D is the uncontrolled maximum open-loop response of the system when the lag bus value exceeds 15. When the lag bus value exceeds 15 the entire velocity measurement and correction logic contains erroneous values which are not relevant because decode lag equal or greater than 16 (111) will be ON, inverter 112 will be ON and the lag less than 16 line 63 will be OFF so that the reset to motor drive trigger 56 through AND 64 is prevented; the motor duty cycle then becomes 100% giving the velocity response curve D of FIG. 5.

The previous discussion is based on a required motion to the right from a stopped position. In FIG. 3a when right lag=0 (76) goes ON indicating all required right motion has taken place), the run control trigger 78 will reset through AND 79 if the left lag=0 (77) is also zero (no left motion is required either). When right lag=0 goes ON, single shot 83 is fired through OR 82. IF the left lag=0 (77) is ON inverter 87 will block AND 86 so that direction control trigger 85 will not change state. If left lag=0 (77) is OFF, AND's 79 and 84 are blocked so run control 78 will stay ON while direction control trigger 85 will reset to direction left 59 through AND 86. In FIG. 3b with direction left 59 ON, the motor drive 56 will turn ON AND 60 and motor drivers 46 and 47 so that the power will be supplied for counterclockwise or left motor motion if still going right, dynamic braking occurs. The converse is true with the opposite set of conditions.

Since this particular embodiment is for a unidirectional printer, FIG. 3c shows the logic that controls the print carrier return to the left margin. When a non-print left command is received and the DPC Not 0 (127) is ON, blank characters are gated through AND 129 at a very high rate relative to mechanical motion. The signal non-print left blanks 104 simultaneously increments the left lag counter 130 through OR 131 and decrements the data position counter 103 until counter 103 value matches the left margin value appearing on the margin/tab bus as determined by comparator 128 output DPC unequal 127 going OFF. The end of this signal will terminate the non-print left instruction and block AND 129.

When any right motion is completed, direction right 57 goes OFF and direction left 59 goes ON. AND 133 now gates the left lag counter 130 onto the lag bus and direction test 132 provides a lag change signal 65 through OR 125. Left motion is controlled identically to right motion although decodes 127, 128, 129 and 111 could be gated for right motion and have a companion set with different velocity control profile for left motion if desired.

Any time the left lag counter 130 changes while direction left 59 is ON, OR 134 output is gated through AND 135 and OR 125 to give a lag change signal 65. To keep track of carrier position when the motor is not being driven, motion to the left of the stopped position is saved in the right lag counter 120. If the left lag counter 130 is at zero and one column left 100 occurs, AND 136 increments counter 120 through OR 119; it also provides a manual move left signal 114 that forces a blank character into FIFO buffer 34 through OR 113, AND 32 and OR 33 because the character data bus out of AND 31 is OFF. As the carrier moves right (but still left of the stopped position), counter 120 is not zero, inverter 137 is OFF so one column right signal 99 gates through AND 138 where it decrements the counter 120 and removes the blank put in FIFO buffer 34 by giving a FIFO read-out 116. If the carrier is then pushed to the right through the stopped position, the counter 120 goes to zero and its input AND's 136 and 138 become degated. As right motion continues, one column right 99 increments the left lag counter 130 through AND 139 and OR 131. If left motion to the right of the stopped position occurs, one column left decrements the left lag counter 130 through AND 140 because counter 130 is not zero and inverter 141 if OFF.

It can be appreciated that this velocity control system can have a variety of changes that fall within the scope of this disclosure. These are (a) there can be any number of feedback pulses per test period as opposed to the one illustrated, (b) there can be an arbitrary number of velocity slope transfer functions which can change slope at any desired lag value, (c) there can be any desired pulse width resolution within the drive period counter interval, (d) that pulse width resolution bears no needful relationship to the lag function even though they show a 1:1 ratio in this example and (e) this design can control a bidirectional printer by having two FIFO buffers and making the appropriate minor logic control changes.

While the invention has been particularly shown and described with reference to a preferred embodiment thereof, it will be understood by those skilled in the art that various changes in form and details may be made therein without departing from the spirit and scope of the invention.

What is claimed is:

1. A control system for moving a carrier having a print head thereon past successive character columns along a print line comprising:
    lag counter means settable with a count representing the number of columns said carrier has yet to be moved along said print line;
    velocity counter means and duty cycle counter means each settable with counts proportional to that in said lag counter means in response to changes in count in said lag counter means;
    drive means operable in response to an energizing signal for moving said carrier and providing feedback signals to decrement said velocity counter means, each said feedback signal being representative of a predetermined fraction of a column moved by said carrier;
    means for generating a succession of said energizing signals at a fixed frequency for said drive means, each said signal having a duration in proportion to the count in said duty cycle counter;
    means including said velocity counter means responsive to said generating means for altering the count in said duty cycle counter means according to the count standing in said velocity counter means; and
    column detection means responsive to said feedback signals for decrementing said lag counter means each time said carrier has traveled a distance of one column along said print line.

2. Apparatus as described in claim 1 wherein said altering means is operable to increment the count in said duty cycle counter means when said velocity counter means is not zero at the conclusion of a said energizing signal and operable to decrement the count in said duty cycle counter means when the count in velocity counter means is zero.

3. Apparatus as described in claim 1 wherein said drive means is reversible in direction and said lag counter means includes a pair of counter means controllable for opposite movement of said carrier and further including direction control means for selectively energizing said opposite counter means for desired movement and gating said drive means for motion appropriate.

4. Apparatus as described in claim 2 wherein said altering means modifies the count in said duty cycle counter means for each said energizing signal.

5. Apparatus as described in claim 1 wherein said velocity counter means includes means for varying the decrementing rate of its said count in response to said feedback signals according to the magnitude of the count set in said lag counter means.

6. Apparatus as described in claim 5 wherein said decrementing rate is variable inversely to the change in magnitude of said counts in said column counter means.

7. Apparatus as described in claim 1 including means for preventing termination of a said energizing signal when said lag counter means exceeds a predetermined maximum limit.

8. A variable velocity control system for moving a carrier having a print head thereon past successive character columns along a print line comprising:
    lag counter means for storing the number of columns said carrier has yet to be moved;
    velocity counter means and duty cycle counter means each settable to a count proportional to that of said lag counter means;
    motor drive means for moving said carrier in response to a drive signal and providing a feedback signal for each predetermined fraction of column-to-column distance moved;
    motor energizing means producing a sequence of timed signals and operable on a selected one of said sequence of signals to provide a said drive signal to energize said motor drive means;
    means connecting said feedback signals to decrement said velocity counter means according to the said column fractions moved by said carrier;
    comparator means connected to said duty cycle counter means and motor energizing means and responsive to another of said sequence of signals for terminating said drive signal;
    means responsive to at least one signal of each said sequence of signals for incrementing said duty cycle counter means when said velocity counter means is greater than zero, and decrementing said duty cycle counter means when said velocity counter means is zero;
    means connected to said feedback signals for accumulating a feedback signal count and providing a column output signal each time said accumulated total indicates motion equal to a said column;
    means connecting said column output signal to said lag counter means for decrementing the count therein; and
    means responsive to a change in said lag counter means for resetting said velocity and duty cycle counter means to the count proportional to said lag counter means.

9. Apparatus as described in claim 8 wherein said comparator means compares the count in said duty cycle counter means and the number of each signal in said sequence and terminates said motor energization upon detecting count equality.

10. A control system for moving a carrier having a print head thereon past successive character columns along a print line comprising:
    lag counter means settable with a count representing the number of columns said carrier is to be moved along said print line;
    velocity counter means and duty cycle counter means each settable with counts proportional to the count in said lag counter means in response to changes in the setting of the latter of said means;

drive means operable in response to an energizing signal for moving said carrier along said print line and producing a plurality of successive feedback signals for each said column distance moved and applying said feedback signals to decrement the count of said velocity counter means;

means for repetitively generating a fixed sequence of output signals, one of which is operable to initiate a said energizing signal;

means for comparing the count in said duty cycle counter means with the position number of each of said output signals in said sequence and terminating said energizing signal upon detecting equality;

means responsive to one of said output signals in said sequence during each sequence for incrementing the the content of said duty cycle counter means if the count in said velocity counter means is not zero and decrementing the content of said duty cycle counter means when said velocity counter means is zero; and column detection means responsive to said feedback signals for decrementing said lag counter means each time a said plurality thereof represents a column distance.

11. Apparatus as described in claim 10 wherein said velocity counter means and duty cycle counter means are each limited to count capacities less than that necessary for a said print line.

12. Apparatus as described in claim 11 wherein said capacities of said velocity counter means and said duty cycle counter means are equal.

13. Apparatus as described in claim 10 further including means for setting said lag counter means with the number of columns said carrier is yet to be moved.

* * * * *